(12) United States Patent
Hirakawa

(10) Patent No.: US 7,808,723 B2
(45) Date of Patent: Oct. 5, 2010

(54) PHOTOGRAPHIC LENS SYSTEM AND ELECTRONIC IMAGING DEVICE USING THE SAME

(75) Inventor: Jun Hirakawa, Kanagawa (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/558,767

(22) Filed: Sep. 14, 2009

(65) Prior Publication Data
US 2010/0073777 A1    Mar. 25, 2010

(30) Foreign Application Priority Data
Sep. 19, 2008    (JP) .............................. 2008-240378

(51) Int. Cl.
 *G02B 9/64* (2006.01)
 *G02B 9/00* (2006.01)
 *G02B 15/14* (2006.01)
(52) U.S. Cl. ..................... 359/755; 359/754; 359/740; 359/683
(58) Field of Classification Search .................. 359/683, 359/740, 754, 755
See application file for complete search history.

(56) References Cited

U.S. PATENT DOCUMENTS
5,835,286 A * 11/1998 Yamanashi .................. 359/755

2007/0177865 A1  8/2007  Nomura et al.
2007/0183769 A1  8/2007  Ishizuka

FOREIGN PATENT DOCUMENTS
JP    6-242370    9/1994
JP    7-159691    6/1995

OTHER PUBLICATIONS

English language Abstract of JP 6-242370, Sep. 2, 1994.
English language Abstract of JP 7-159691, Jun. 23, 1995.

* cited by examiner

*Primary Examiner*—Jack Dinh
(74) *Attorney, Agent, or Firm*—Greenblum & Bernstein P.L.C.

(57) ABSTRACT

A photographic lens system includes a positive lens element, a positive lens element, a negative lens element having a concave surface facing toward the image, a diaphragm, a negative lens element having a concave surface facing toward the object, a positive lens element which is cemented to the negative lens element, and two or three positive lens elements, in this order from the object. An intermediate negative lens element, having the weakest negative refractive power out of all of the negative lens elements, is provided between the negative lens element having the concave surface facing toward the image and the negative lens element having the concave surface facing toward the object.

5 Claims, 8 Drawing Sheets

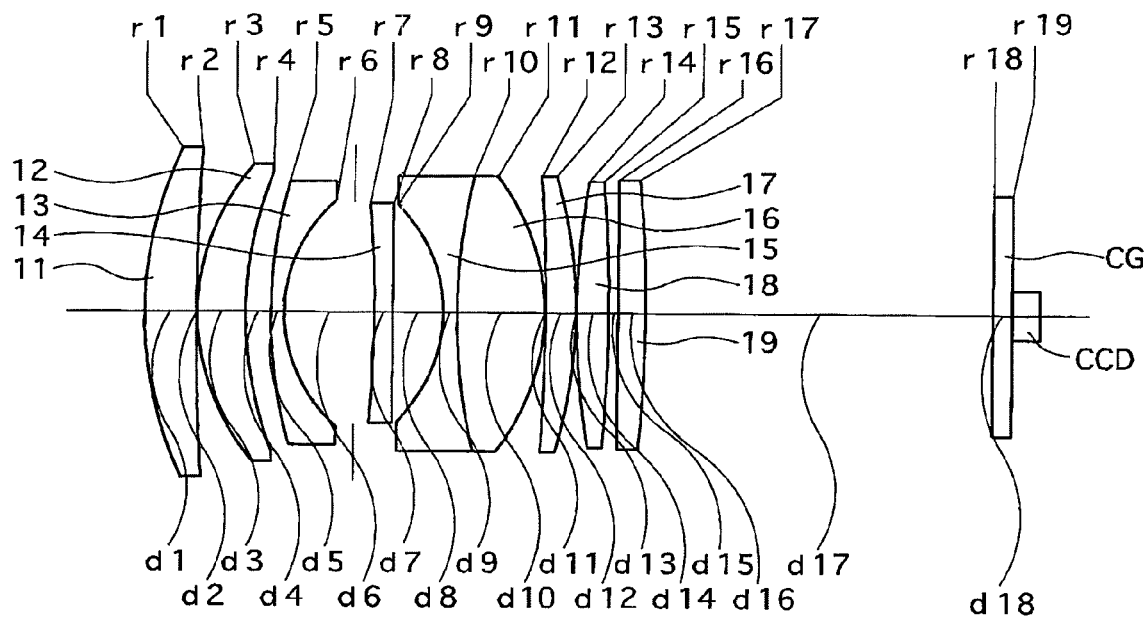
Fig.1
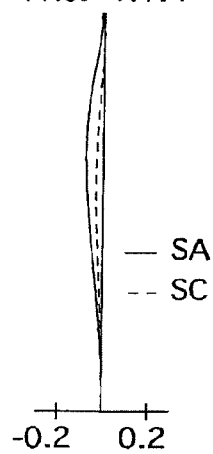
Fig.2A
FNo.=1:1.4
— SA
-- SC
-0.2  0.2
SPHERICAL
ABERRATION
THE SINE
CONDITION
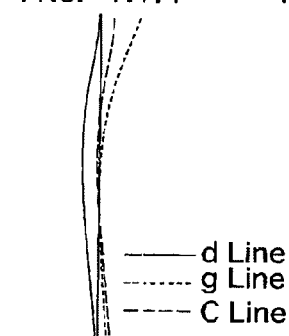
Fig.2B
FNo.=1:1.4
—— d Line
······ g Line
---- C Line
-0.2  0.2
SPHERICAL
ABERRATION
CHROMATIC
ABERRATION
Fig.2C
Y=14.24
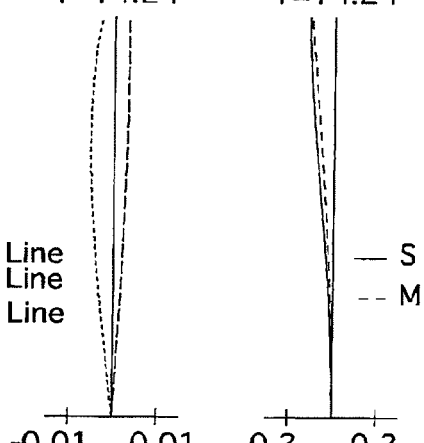
-0.01  0.01
LATERAL
CHROMATIC
ABERRATION
Fig.2D
Y=14.24
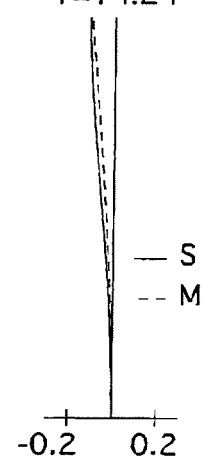
— S
-- M
-0.2  0.2
ASTIGMATISM
Fig.2E
Y=14.24
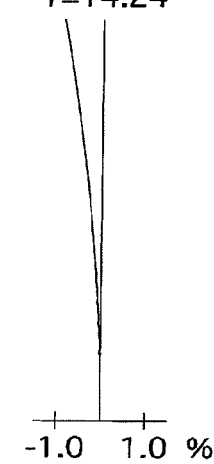
-1.0  1.0 %
DISTORTION

Fig.4
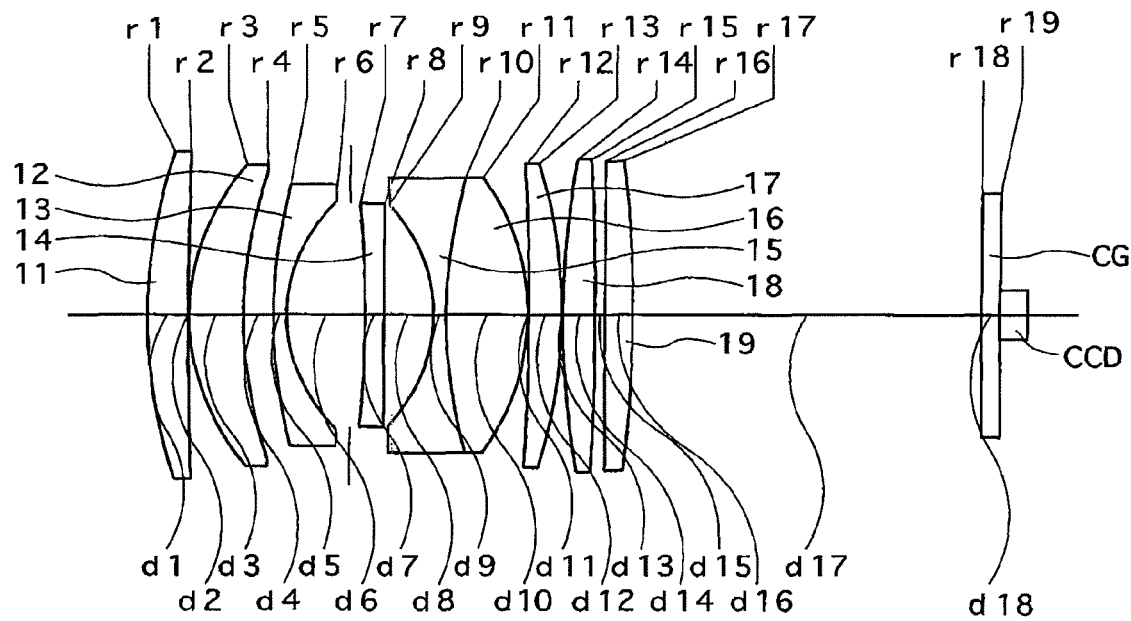
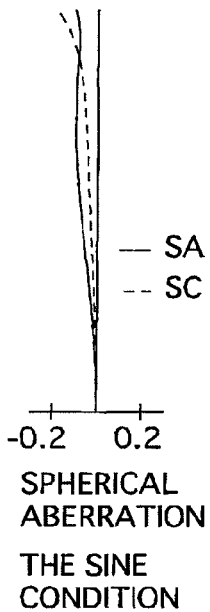
Fig.5A
FNo.=1:1.5
— SA
-- SC
-0.2  0.2
SPHERICAL
ABERRATION
THE SINE
CONDITION
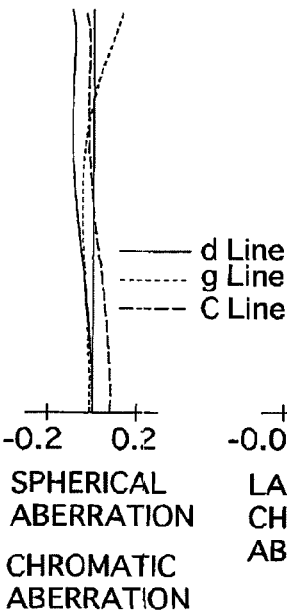
Fig.5B
FNo.=1:1.5
—— d Line
----- g Line
---- C Line
-0.2  0.2
SPHERICAL
ABERRATION
CHROMATIC
ABERRATION
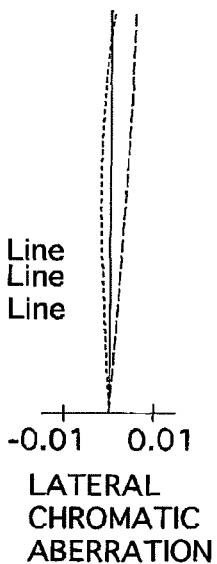
Fig.5C
Y=14.24
-0.01  0.01
LATERAL
CHROMATIC
ABERRATION
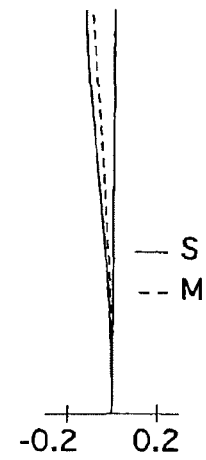
Fig.5D
Y=14.24
— S
-- M
-0.2  0.2
ASTIGMATISM
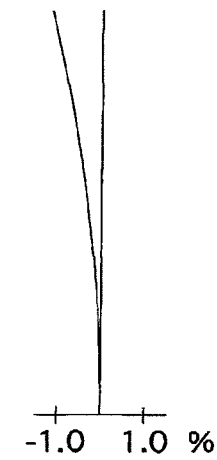
Fig.5E
Y=14.24
-1.0  1.0 %
DISTORTION Fig.7
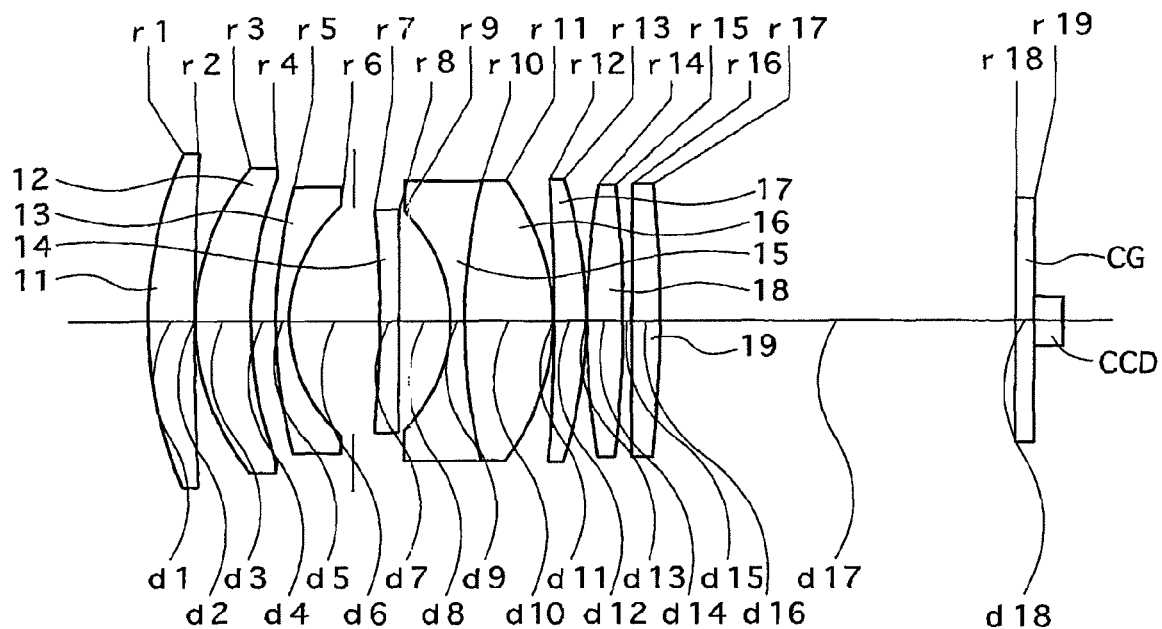
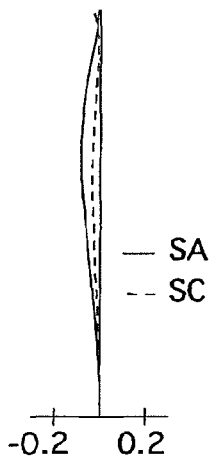
Fig.8A
FNo.=1:1.4
— SA
-- SC
-0.2  0.2
SPHERICAL
ABERRATION
THE SINE
CONDITION
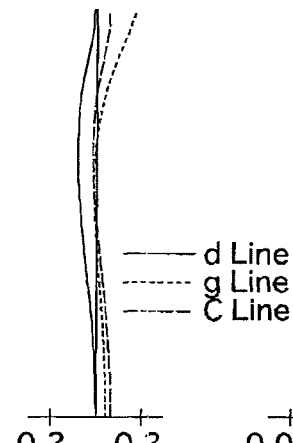
Fig.8B
FNo.=1:1.4
— d Line
---- g Line
—-— C Line
-0.2  0.2
SPHERICAL
ABERRATION
CHROMATIC
ABERRATION
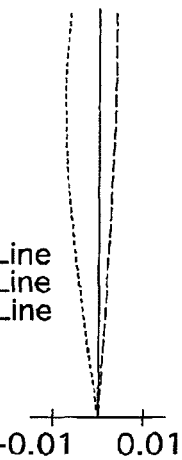
Fig.8C
Y=14.24
-0.01  0.01
LATERAL
CHROMATIC
ABERRATION
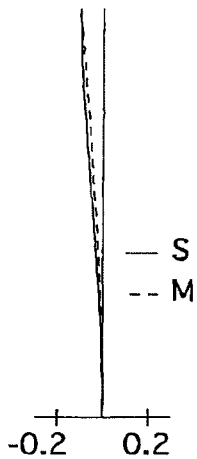
Fig.8D
Y=14.24
— S
-- M
-0.2  0.2
ASTIGMATISM
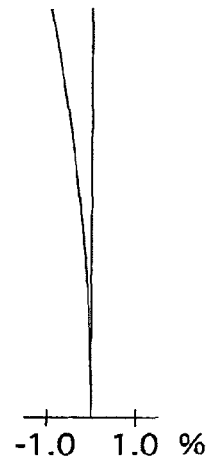
Fig.8E
Y=14.24
-1.0  1.0  %
DISTORTION Fig. 10
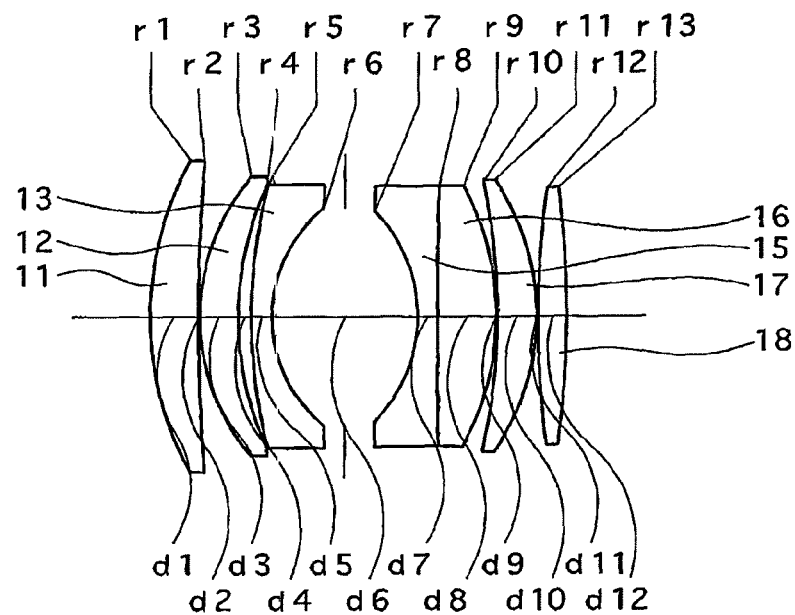
Fig. 11A
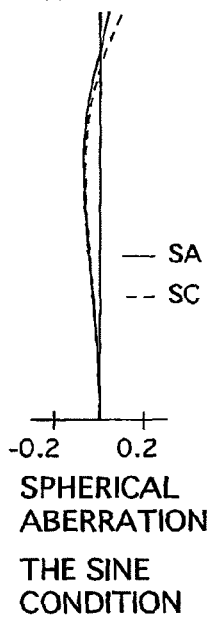
SPHERICAL ABERRATION
THE SINE CONDITION
Fig. 11B
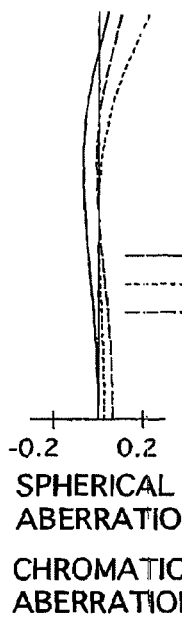
SPHERICAL ABERRATION
CHROMATIC ABERRATION
Fig. 11C
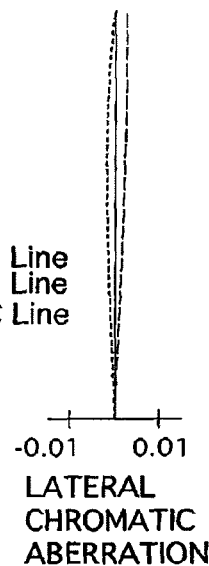
LATERAL CHROMATIC ABERRATION
Fig. 11D
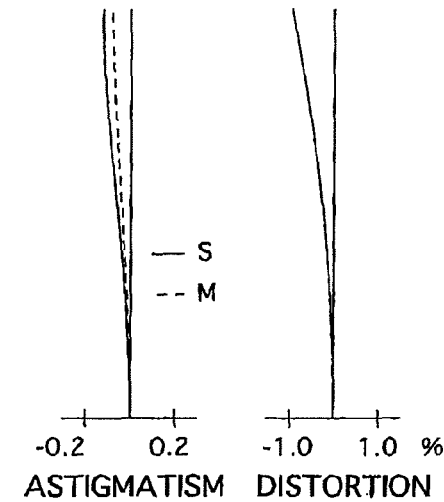
ASTIGMATISM
Fig. 11E
DISTORTION

PHOTOGRAPHIC LENS SYSTEM AND ELECTRONIC IMAGING DEVICE USING THE SAME

BACKGROUND OF THE INVENTION

1. Field of the Invention

The present invention relates to a photographic lens system having an f-number of approximately 1.4 and a half angle-of-view of approximately 14°, and also relates to an electronic imaging device using the same.

2. Description of Related Art

FIG. 10 shows a photographic lens system according to the related art (e.g., Japanese Unexamined Patent Publication No. H06-242370) which is a comparative example and the subject of improvement by the present invention.

The photographic lens system shown in FIG. 10 includes a positive lens element, a positive lens element, a negative lens element having a concave surface facing toward the image, a diaphragm, a cemented lens having a negative lens element having a concave surface facing toward the object and a positive lens element, and two positive lens elements, in this order from the object.

However, in this comparative example, sagittal lateral aberration was particularly undercorrected.

The present invention provides a photographic lens system in which sagittal lateral aberration is adequately corrected.

SUMMARY OF THE INVENTION

As a result of the inventor's study on the reasons why the correcting of sagittal lateral aberration is difficult, it is concluded that if each of the concave surfaces of the negative lens elements, provided on each side of the diaphragm as shown in FIG. 10, is provided with a strong negative refractive power, such an optical arrangement makes the correcting of sagittal lateral aberration difficult. Furthermore, it is found that if an intermediate (auxiliary) negative lens element having a weak negative refractive power is disposed between the above-mentioned concave surfaces of the negative lens elements, sagittal lateral aberration can be adequately corrected.

According to an aspect of the present invention, there is provided a photographic lens system including a positive lens element, a positive lens element, a negative lens element having a concave surface facing toward the image, a diaphragm, a negative lens element having a concave surface facing toward the object, a positive lens element which is cemented to the negative lens element, and two or three positive lens elements, in this order from the object.

An intermediate negative lens element, having the weakest negative refractive power out of all of the negative lens elements provided in the photographic lens system, is provided between the negative lens element having the concave surface facing toward the image and the negative lens element having the concave surface facing toward the object.

The photographic lens system preferably satisfies the following condition:

$$0.1 < |f|/|f4| < 0.3 \quad (f4<0) \qquad (1)$$

wherein f designates the focal length of the entire photographic lens system; and f4 designates the focal length of the intermediate negative lens element.

In the photographic lens system of the present invention, it is possible to employ a focusing mechanism in which the entire lens system is advanced for focusing. However, it is more preferable to employ a focusing mechanism in which the most image-side lens element is made stationary, and all the lens elements which are provided on the object-side from the most image-side lens element are arranged to move toward the object upon focusing on an object at a close distance. According to this focusing operation, the correcting of spherical aberration is suitably carried out when an object at a close distance is photographed.

The photographic lens system preferably satisfies the following condition:

$$60 < \nu \qquad (2)$$

wherein $\nu$ designates the maximum Abbe number out of the Abbe numbers of the positive lens elements which are provided on the image-side of the diaphragm, and are arranged to move upon focusing.

According to another aspect of the present invention, there is provided an electronic imaging device comprising an image sensor on which an object image is formed through the photographic lens system.

The present disclosure relates to subject matter contained in Japanese Patent Application No. 2008-240378 (filed on Sep. 19, 2008) which is expressly incorporated herein in its entirety.

BRIEF DESCRIPTION OF THE DRAWINGS

The present invention will be discussed below in detail with reference to the accompanying drawings, in which:

FIG. 1 shows a lens arrangement of a first embodiment of a photographic lens system according to the present invention;

FIGS. 2A, 2B, 2C, 2D and 2E show aberrations occurred in the lens arrangement shown in FIG. 1 when an object at infinity is in an in-focus state;

FIG. 4 shows a lens arrangement of a second embodiment of a photographic lens system according to the present invention;

FIGS. 5A, 5B, 5C, 5D and 5E show aberrations occurred in the lens arrangement shown in FIG. 4 when an object at infinity is in an in-focus state;

FIG. 7 shows a lens arrangement of a third embodiment of a photographic lens system according to the present invention;

FIGS. 8A, 8B, 8C, 8D and 8E show aberrations occurred in the lens arrangement shown in FIG. 7 when an object at infinity is in an in-focus state;

FIG. 10 shows a lens arrangement of a comparative example of a photographic lens system;

FIGS. 11A, 11B, 11C, 11D and 11E show aberrations occurred in the lens arrangement shown in FIG. 10 when an object at infinity is in an in-focus state.

DESCRIPTION OF THE PREFERRED EMBODIMENTS

Figure 3B:
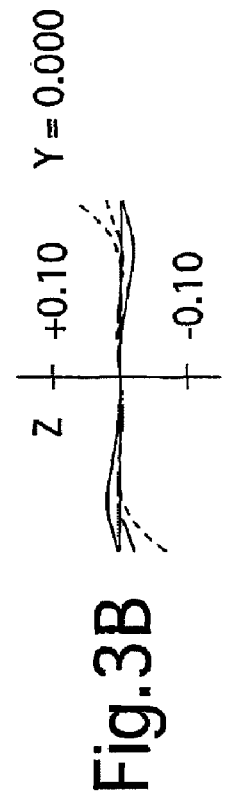
FIGS. 3A, 3B, 3C, 3D, 3E, 3F, 3G and 3H show lateral aberrations occurred in the lens arrangement shown in FIG. 1.
Figure 3D:
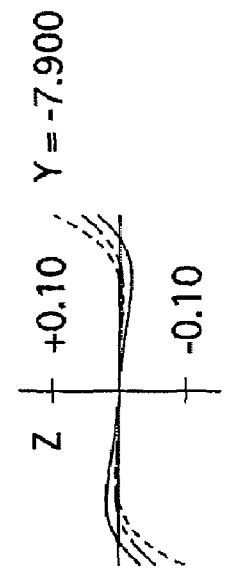
Figure 3F:
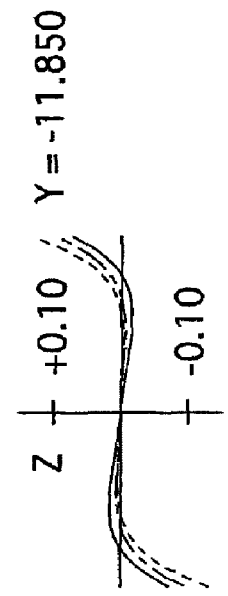
Figure 3H:
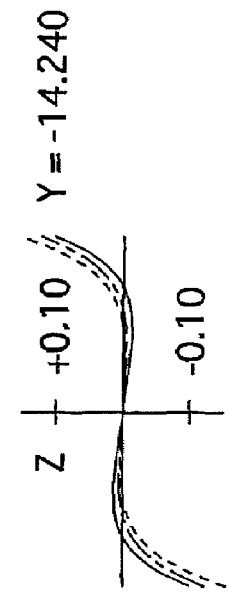
Figure 3A:
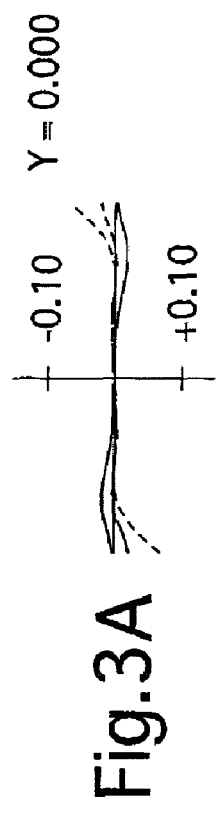
Figure 3C:
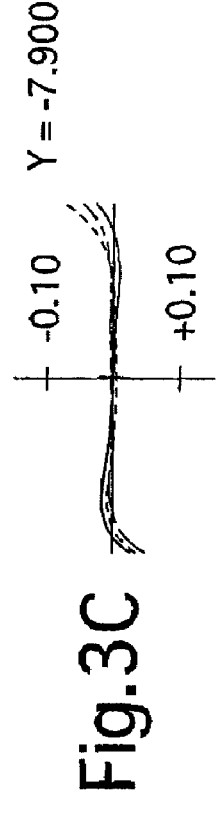
Figure 3E:
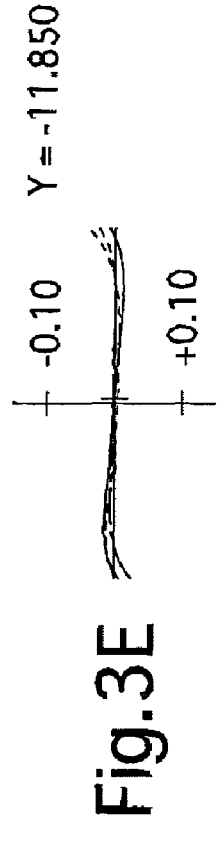
Figure 3G:
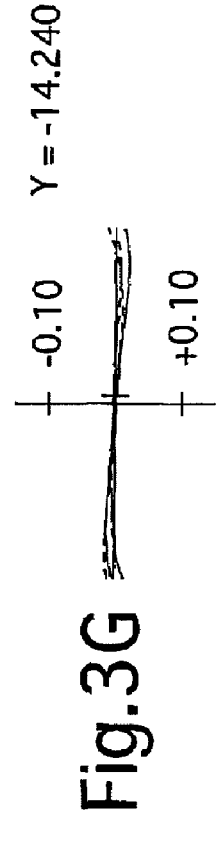
Figure 6B:
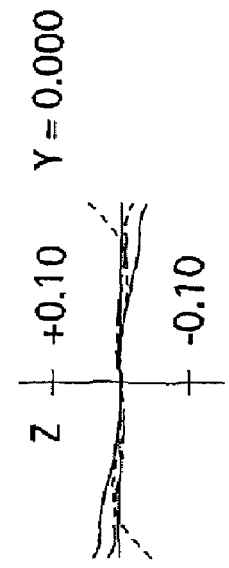
FIGS. 6A, 6B, 6C, 6D, 6E, 6F, 6G and 6H show lateral aberrations occurred in the lens arrangement shown in FIG. 4.
Figure 6D:
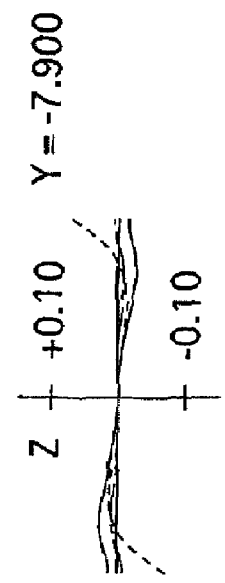
Figure 6F:
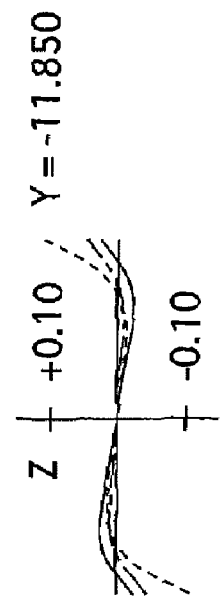
Figure 6H:
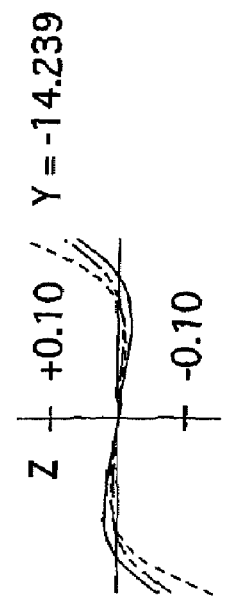
Figure 6A:
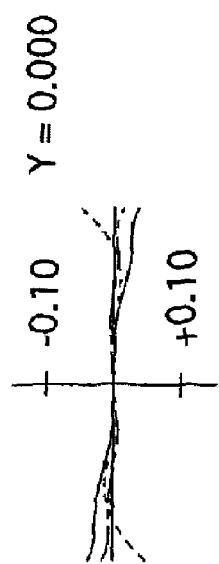
Figure 6C:
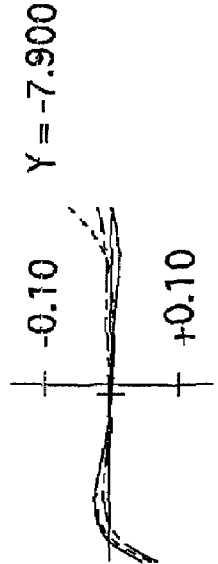
Figure 6E:
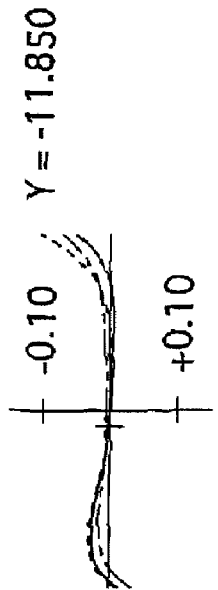
Figure 6G:
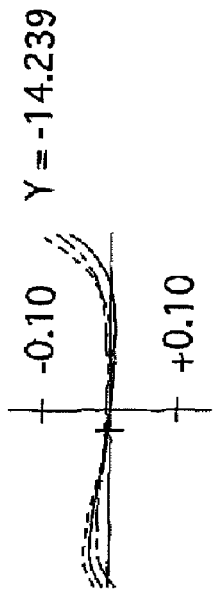

As shown in the embodiments of FIGS. 1, 4 and 7, the photographic lens system according to the present invention includes a positive lens element (a positive meniscus lens element having the convex surface facing toward the object) 11, a positive lens element (a positive meniscus lens element having the convex surface facing toward the object) 12, a negative lens element (a negative meniscus lens element) 13 having a concave surface on the image side, a diaphragm S, an intermediate negative lens element (a negative lens element having a concave surface facing toward the object) 14 having a weak negative refractive power, a negative lens element 15 having a concave surface facing toward the object (a biconcave negative lens element) and a positive lens element (biconvex positive lens element) 16 which is cemented to the negative lens element 15, a positive lens element (a positive meniscus lens element having the convex surface facing toward the image) 17, a positive lens element (a biconvex positive lens element) 18 and a positive lens element (a positive lens element having a convex surface facing toward the image) 19, in this order from the object.

The lens arrangement of the present invention significantly differs from the comparative example shown in FIG. 10 by having the intermediate negative lens element 14 provided between the negative lens element 13 having the concave surface facing toward the image and the negative lens element 15 having the concave surface facing toward the object, and by having three positive lens elements provided on the image side of the negative lens element 15 and the positive lens element 16 which is cemented to the negative lens element 15 (hereinafter, the cemented lens elements 15 and 16) instead of two positive lens elements.

The intermediate negative lens element 14 has the weakest negative refractive power out of those of all the negative lens elements provided in the photographic lens system.

By disposing the weak negative-powered intermediate negative lens element 14 between the negative lens elements 13 and 15, which are provided on either side of the diaphragm S, sagittal lateral aberration, in particular, can be suitably corrected.

Furthermore, if the intermediate negative lens element 14 is formed as a planoconcave lens element having the concave surface facing toward the object and the flat surface facing toward the image, the angle of incidence of the light rays being incident on the negative lens element 15 can be advantageously lowered with respect to the concave surface of the negative lens element 15, and the occurrence of higher-degree aberrations at the periphery of the negative lens element 15 can be advantageously prevented.

The intermediate negative lens element 14 can be alternatively provided on the object-side of the diaphragm S.

Condition (1) determines the refractive power of the intermediate negative lens element 14.

If the negative refractive power of the intermediate negative lens element 14 becomes weaker to the extent that f/|f4| exceeds the lower limit of condition (1), the correcting of sagittal lateral aberration cannot be sufficiently carried out.

If the negative refractive power of the intermediate negative lens element 14 becomes strong to the extent that f/|f4| exceeds the upper limit of condition (1), other aberrations (e.g., meridional lateral aberration) occur, and the correcting thereof becomes difficult.

Furthermore, in the illustrated embodiments, one of the reasons why three positive lens element are provided on the image side of the cemented lens elements 15 and 16 is due to the focusing mechanism.

In the illustrated embodiments, for the purpose of adequately correcting spherical aberration especially when the object at a closer distance is in an in-focus state, the lens element provided closest to the image is stationary and the remaining lens elements provided on the object side are moved toward the object, upon focusing on an object at a close distance. In other words, a surplus positive lens element as the stationary lens element is employed.

On the other hand, if an attempt is made to employ a focusing mechanism in which all the lens elements of the photographic lens system are arranged to advance upon focusing, the number of positive lens elements provided on the image side of the cemented lens elements 15 and 16 can be reduced to two positive lens element.

Condition (2) determines the maximum Abbe number out of the Abbe numbers of the positive lens elements which are provided on the image-side of the diaphragm, and are arranged to move upon focusing.

By satisfying condition (2), chromatic aberration can be reduced to a minimum.

Specific numerical embodiments will be herein discussed.

In the diagrams of spherical aberration and the sine condition, SA designates spherical aberration, SC designates the sine condition.

In the diagrams of chromatic aberration (axial chromatic aberration) represented by spherical aberration, the solid line and the two types of dotted lines respectively indicate spherical aberrations with respect to the d, g and C lines.

Also, in the diagrams of lateral chromatic aberration, the two types of dotted lines respectively indicate magnification with respect to the g and C lines; however, the d line as the base line coincides with the ordinate.

In the diagrams of astigmatism, S designates the sagittal image, and M designates the meridional image.

In the tables, $F_{NO}$ designates the F-number, Y designates the image height, f designates the focal length of the entire photographic lens system, W designates the half angle-of-view (°), fB designates the back focal distance (the distance from the image-side surface of the most image-side cover glass to the image plane), r designates the radius of curvature, d designates the lens-element thickness or distance between lens elements, Nd designates the refractive index of the d-line, and νd designates the Abbe number.

The values for the distance "d" which are variable according to focusing are indicated in the order of infinity and the closest photographic distance.

Embodiment 1

FIG. 1 shows the lens arrangement of the first embodiment of a photographic lens system according to the present invention. FIGS. 2A through 2E show aberrations occurred in the lens arrangement shown in FIG. 1 when an object at infinity is in an in-focus state. FIGS. 3A through 3H show lateral aberrations occurred in the lens arrangement shown in FIG. 1.

Table 1 shows the numerical data of the first embodiment.

The photographic lens system described in the following first through third embodiments has an angle-of-view of 14° which is more telescopic compared to a standard lens system (having an angle-of-view of, e.g., approximately) 23°).

The photographic lens system of the first embodiment includes a positive meniscus lens element 11 having the convex surface facing toward the object, a positive meniscus lens element 12 having the convex surface facing toward the object, a negative meniscus lens element 13 having the concave surface facing toward the image, a diaphragm S, a planoconcave lens element 14 having a gently curved concave surface facing toward the object, the biconcave negative lens element 15 and the biconvex positive lens element 16 which is cemented to the biconcave negative lens element 15 (hereinafter, the cemented lens elements 15 and 16), the positive meniscus lens element 17 having the convex surface facing toward the image, the biconvex positive lens element 18, and the planoconvex positive lens element 19 having a convex surface facing toward the image, in this order from the object.

Surface Nos. 18 and 19 define a cover glass (filter group) C which is disposed in front of an image sensor. A CCD is provided behind the cover glass C.

Upon focusing on a close-distance object, the positive lens element 19 which is provided closest to the image remains stationary, and the remaining lens elements 11 through 18 integrally move toward the object.

The diaphragm S is provided 7.49 behind (on the image side of) the third lens element (negative meniscus lens element) 13 (surface No. 6).

TABLE 1

FNO. = 1:1.4
f = 56.36
M = −0.173
W = 14.3
fB = 0.0

| Surface No. | r | d | Nd | ν |
|---|---|---|---|---|
| 1 | 50.922 | 5.50 | 1.77250 | 49.6 |
| 2 | 328.301 | 0.10 | | |
| 3 | 29.259 | 5.16 | 1.80610 | 40.9 |
| 4 | 50.460 | 2.66 | | |
| 5 | 63.688 | 1.41 | 1.69895 | 30.1 |
| 6 | 19.203 | 9.68 | | |
| 7 | −150.000 | 2.00 | 1.58144 | 40.7 |
| 8 | ∞ | 5.49 | | |
| 9 | −19.310 | 1.50 | 1.76182 | 26.5 |
| 10 | 77.297 | 9.43 | 1.83400 | 37.2 |
| 11 | −28.608 | 0.10 | | |
| 12 | −251.725 | 3.24 | 1.80610 | 40.9 |
| 13 | −64.000 | 0.10 | | |
| 14 | 104.000 | 3.42 | 1.59240 | 68.3 |
| 15 | −197.685 | 1.00-13.27 | | |
| 16 | ∞ | 3.00 | 1.48749 | 70.2 |
| 17 | −174.750 | 37.41 | | |
| 18 | ∞ | 2.00 | | |
| 19 | ∞ | — | | |

Embodiment 2

FIG. 4 shows the lens arrangement of a second embodiment of a photographic lens system according to the present invention. FIGS. 5A through 5E show aberrations occurred in the lens arrangement shown in FIG. 4 when an object at infinity is in an in-focus state. FIGS. 6A through 6H show lateral aberrations occurred in the lens arrangement shown in FIG. 4.

Table 2 shows the numerical data of the second embodiment.

The fundamental lens arrangement of the second embodiment is the same as that of the first embodiment.

The diaphragm S is provided 6.76 behind (on the image side of) the third lens element (negative meniscus lens element) 13 (surface No. 6).

TABLE 2

FNO. = 1:1.5
f = 56.07
M = −0.173
W = 14.4
fB = 0.0

| Surface No. | r | d | Nd | ν |
|---|---|---|---|---|
| 1 | 65.569 | 4.32 | 1.77250 | 49.6 |
| 2 | 550.208 | 0.10 | | |
| 3 | 29.280 | 5.74 | 1.80610 | 40.9 |
| 4 | 56.320 | 3.22 | | |
| 5 | 66.392 | 1.41 | 1.69895 | 30.1 |
| 6 | 19.998 | 8.35 | | |
| 7 | −150.000 | 2.00 | 1.58144 | 40.7 |
| 8 | ∞ | 5.44 | | |
| 9 | −20.096 | 1.35 | 1.76182 | 26.5 |
| 10 | 65.043 | 8.85 | 1.83400 | 37.2 |
| 11 | −29.563 | 0.10 | | |
| 12 | −332.532 | 3.55 | 1.78590 | 44.2 |
| 13 | −65.707 | 0.10 | | |
| 14 | 115.451 | 3.46 | 1.77250 | 49.6 |
| 15 | −385.834 | 1.00-13.30 | | |
| 16 | ∞ | 3.00 | 1.48749 | 70.2 |
| 17 | −170.312 | 37.39 | | |
| 18 | ∞ | 2.00 | | |
| 19 | ∞ | — | | |

Embodiment 3

Figure 9A:
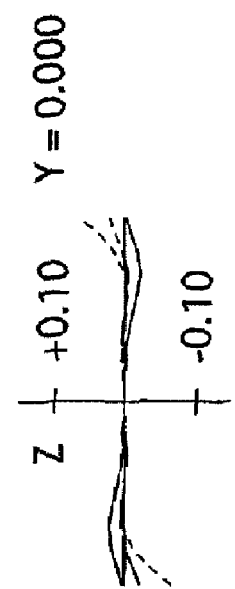
FIGS. 9A, 9B, 9C, 9D, 9E, 9F, 9G and 9H show lateral aberrations occurred in the lens arrangement shown in FIG. 7.
Figure 9B:
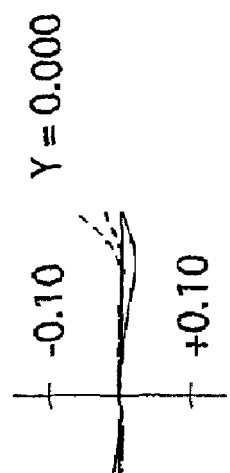
Figure 9C:
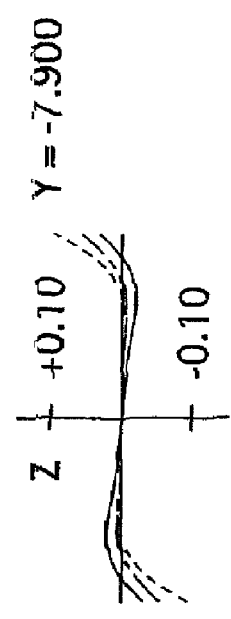
Figure 9D:
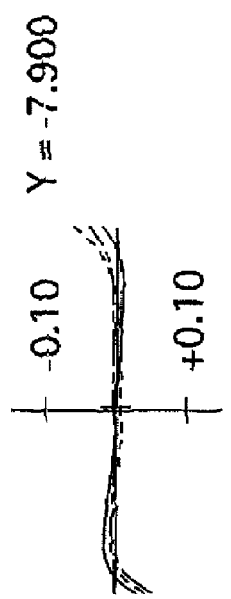
Figure 9E:
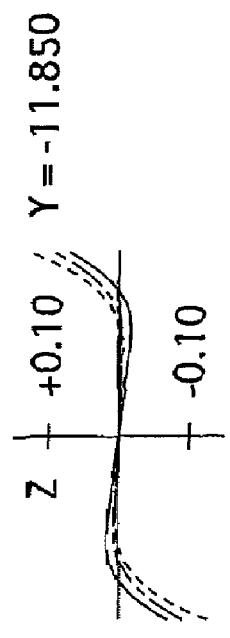
Figure 9F:
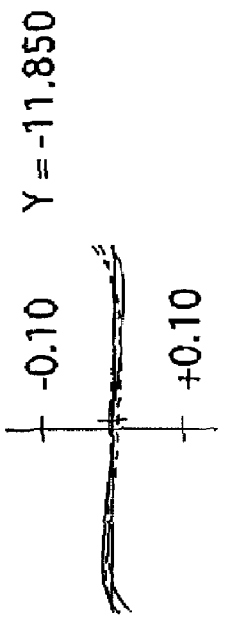
Figure 9G:
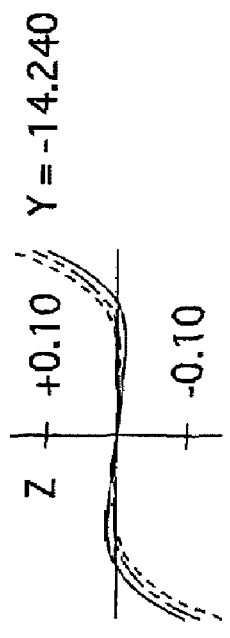
Figure 9H:
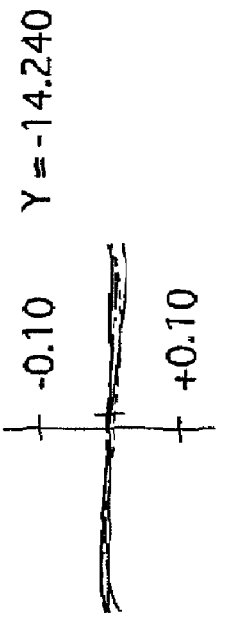
Figure 12A:
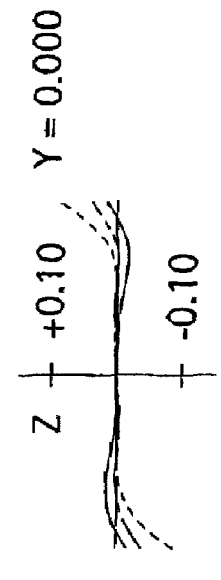
FIGS. 12A, 12B, 12C, 12D, 12E, 12F, 12G and 12H show lateral aberrations occurred in the lens arrangement shown in FIG. 10.
Figure 12B:
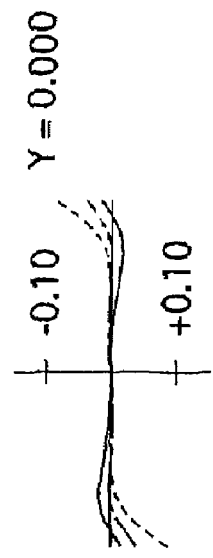
Figure 12C:
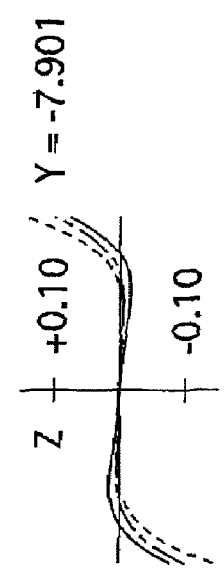
Figure 12D:
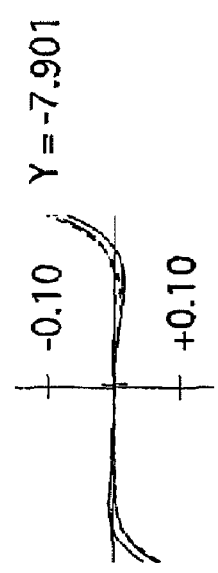
Figure 12E:
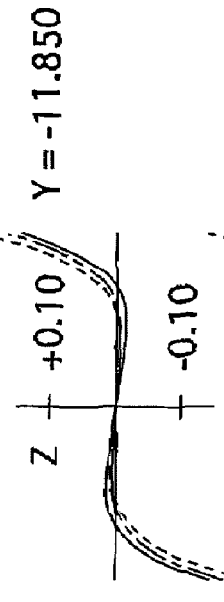
Figure 12F:
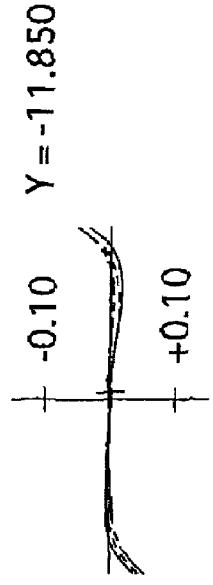
Figure 12G:
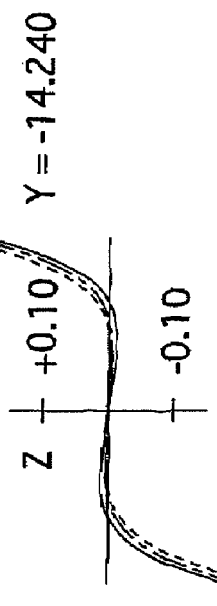
Figure 12H:
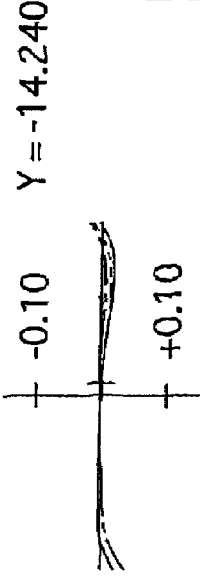

FIG. 7 shows the lens arrangement of the third embodiment of a photographic lens system according to the present invention. FIGS. 8A through 8E show aberrations occurred in the lens arrangement shown in FIG. 7 when an object at infinity is in an in-focus state. FIGS. 9A though 9H show lateral aberrations occurred in the lens arrangement shown in FIG. 7.

Table 3 shows the numerical data of the third embodiment.

The fundamental lens arrangement of the third embodiment is that same as that of the first embodiment.

The diaphragm S is provided 6.80 behind (on the image side of) the third lens element (negative meniscus lens element) 13 (surface No. 6).

TABLE 3

FNO. = 1:1.4
f = 56.36
M = −0.173
W = 14.3
fB = 0.02

| Surface No. | r | d | Nd | ν |
|---|---|---|---|---|
| 1 | 54.300 | 4.85 | 1.77250 | 49.6 |
| 2 | 373.730 | 0.10 | | |
| 3 | 29.989 | 5.98 | 1.80610 | 40.9 |
| 4 | 53.340 | 2.55 | | |
| 5 | 66.762 | 1.41 | 1.69895 | 30.1 |
| 6 | 19.465 | 9.58 | | |
| 7 | −150.000 | 2.00 | 1.58144 | 40.7 |
| 8 | ∞ | 5.51 | | |
| 9 | −19.380 | 1.50 | 1.76182 | 26.5 |
| 10 | 75.210 | 9.42 | 1.83400 | 37.2 |
| 11 | −29.250 | 0.10 | | |
| 12 | −244.668 | 3.38 | 1.80610 | 40.9 |
| 13 | −60.000 | 0.10 | | |
| 14 | 110.000 | 3.78 | 1.59240 | 68.3 |
| 15 | −177.690 | 1.00-13.18 | | |
| 16 | ∞ | 3.00 | 1.48749 | 70.2 |
| 17 | −181.168 | 37.62 | | |
| 18 | ∞ | 2.00 | | |
| 19 | ∞ | — | | |

Comparative Example

FIG. 10 shows the lens arrangement of the comparative example of a photographic lens system.

FIGS. 11A through 11E show aberrations occurred in the lens arrangement shown in FIG. 10 when an object at infinity is in an in-focus state. FIGS. 12A through 12H show lateral aberrations occurred in the lens arrangement shown in FIG. 10.

Table 4 shows the numerical data of the comparative example.

The lens arrangement of FIG. 10 does not have the intermediate negative lens element 14 which is provided in the lens arrangements of the embodiments of FIGS. 1, 4 and 7.

The lens elements corresponding to those of the lens arrangements of the embodiments of FIGS. 1, 4 and 7, have the same reference numerals.

Note that the lens arrangement of the comparative example does not have the planoconvex positive lens element 19.

The diaphragm S is provided 7.73 behind (on the image side of) the third lens element (negative meniscus lens element) 13 (surface No. 6).

Furthermore, the aberrations occurred in the comparative example are calculated so as to correspond to the image height of the first through third embodiments of the present invention.

TABLE 4

FNO. = 1:1.4
f = 51.55
W = 15.6
fB = 38.50

| Surface No. | r | d | Nd | ν |
|---|---|---|---|---|
| 1 | 41.367 | 5.09 | 1.77250 | 49.6 |
| 2 | 241.284 | 0.15 | | |
| 3 | 27.126 | 4.14 | 1.83481 | 42.7 |
| 4 | 40.784 | 1.38 | | |
| 5 | 68.568 | 2.19 | 1.64769 | 33.8 |
| 6 | 17.678 | 15.55 | | |
| 7 | −18.632 | 2.10 | 1.80518 | 25.4 |
| 8 | 831.348 | 6.34 | 1.75700 | 47.8 |
| 9 | −34.089 | 0.12 | | |
| 10 | −79.308 | 4.17 | 1.88300 | 40.8 |
| 11 | −30.662 | 0.15 | | |
| 12 | 127.031 | 3.00 | 1.80400 | 46.6 |
| 13 | −127.031 | — | | |

The numerical values of each condition for each embodiment and the comparative example are shown in Table 5.

TABLE 5

| | Condition 1 | Condition 2 |
|---|---|---|
| Embod. 1 | 0.22 | 68.3 |
| Embod. 2 | 0.22 | 70.2 |
| Embod. 3 | 0.22 | 68.3 |
| Comparative Ex. | — | 49.6 |

As can be understood from Table 5, the first through third embodiments satisfy conditions (1) and (2). Furthermore, as can be understood from the aberration diagrams, the various aberrations (especially sagittal lateral aberrations) are well corrected compared to the comparative example.

According to the present invention, sagittal lateral aberration can be adequately corrected due to the photographic lens system including the positive lens element, the positive lens element, the negative lens element having the concave surface facing toward the image, the diaphragm, the intermediate negative lens element, having the weakest negative refractive power out of all of the negative lens elements provided in the photographic lens system, the negative lens element having a concave surface facing toward the object, a positive lens element which is cemented to the negative lens element, and two or three positive lens elements, in this order from the object.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A photographic lens system comprises a positive lens element, a positive lens element, a negative lens element having a concave surface facing toward the image, a diaphragm, a negative lens element having a concave surface facing toward the object, a positive lens element which is cemented to said negative lens element, and two or three positive lens elements, in this order from an object, wherein an intermediate negative lens element, having the weakest negative refractive power out of all of said negative lens elements provided in said photographic lens system, is provided between said negative lens element having the concave surface facing toward the image and said negative lens element having the concave surface facing toward the object.

2. The photographic lens system according to claim 1, satisfying the following condition:

$$0.1 < f/|f4| < 0.3 (f4<0)$$

wherein
f designates the focal length of the entire photographic lens system; and
f4 designates the focal length of said intermediate negative lens element.

3. The photographic lens system according to claim 1, wherein upon focusing on an object at a close distance, the most image-side lens element is made stationary, and all of said lens elements which are provided on the object-side from the most image-side lens element are arranged to move toward the object.

4. The photographic lens system according to claim 3, satisfying the following condition:

$$60 < \nu$$

wherein
ν designates the maximum Abbe number out of the Abbe numbers of said positive lens elements which are provided on the image-side of said diaphragm, and are arranged to move upon focusing.

5. An electronic imaging device comprising an image sensor on which an object image is formed through said photographic lens system according to claim 1.

* * * * *